United States Patent [19]

Bloechl et al.

[11] Patent Number: 4,565,440

[45] Date of Patent: Jan. 21, 1986

[54] DEVICE FOR EXPOSING AND DEVELOPING A LIGHT-SENSITIVE MATERIAL

[75] Inventors: Hanns Bloechl, Unterhaching; Guenther Schnall, Eching, both of Fed. Rep. of Germany

[73] Assignee: Agfa-Gevaert Aktiengesellschaft, Leverkusen, Fed. Rep. of Germany

[21] Appl. No.: 603,211

[22] Filed: Apr. 23, 1984

[30] Foreign Application Priority Data

Apr. 29, 1983 [DE] Fed. Rep. of Germany ....... 3315711

[51] Int. Cl.[4] ........................ G03B 27/52; G03D 9/00

[52] U.S. Cl. ....................................... 355/27; 354/302

[58] Field of Search .................... 355/27, 28, 100, 106, 355/50, 66; 354/301, 302, 303, 305, 319, 320

[56] References Cited

U.S. PATENT DOCUMENTS

| | | | |
|---|---|---|---|
| 3,286,588 | 11/1966 | Wick et al. | 355/66 |
| 3,308,717 | 3/1967 | Okishima et al. | 355/28 |
| 3,592,542 | 7/1971 | Kaufer | 355/50 |
| 3,695,163 | 10/1972 | Stievenart | 354/302 |
| 4,297,027 | 10/1981 | Stemme et al. | 355/106 |

FOREIGN PATENT DOCUMENTS

| | | | |
|---|---|---|---|
| 1174147 | 1/1965 | Fed. Rep. of Germany . | |
| 1203115 | 5/1966 | Fed. Rep. of Germany . | |
| 2033516 | 4/1971 | Fed. Rep. of Germany . | |
| 2851893 | 6/1980 | Fed. Rep. of Germany . | |
| 2107081A | 4/1983 | United Kingdom | 354/301 |

*Primary Examiner*—A. A. Mathews
*Attorney, Agent, or Firm*—Michael J. Striker

[57] ABSTRACT

A device for automatic producing copies in accordance with a diffusion process from a two-sheet material includes a copy-receiving arrangement receiving exposed copies from a diffusion-developing device and having a plurality of flat copy-receiving surfaces positioned in a diffusion space for a full development of the copies being processed. Each copy is located on the respective copy-receiving surface so that no mutual displacement between the positive sheet and negative sheet of each copy takes place. Each copy is transported from the position at the entrance of the diffusion space to the position at the exit of the diffusion space in a step-like fashion. The ends of the copy-receiving surfaces are connected to a rotational transport device one after another in the endless belt-manner.

5 Claims, 3 Drawing Figures

DEVICE FOR EXPOSING AND DEVELOPING A LIGHT-SENSITIVE MATERIAL

BACKGROUND OF THE INVENTION

The present invention relates to a device for exposing and developing light-sensitive material, including an exposing station, and a developing station for processing a two-sheet material according to a diffusion method and a diffusion frame for a full development of finished copies.

One of such devices has been described in German published patent application No. 2,851,893. That device is comprised of a light source, an ink filter, a platform for an original, an image-developing optics, a platform for a light-sensitive material and a developing station remote from the platform for the light-sensitive material.

Another one of photographic exposure-and-development machines has been also disclosed in U.S. Pat. No. 3,308,717. The latter shows an enlarging and printing machine in which the developing and enlarging devices are combined into one apparatus.

SUMMARY OF THE INVENTION

It is an object of the present invention to provide an improved device for exposing and developing light sensitve material.

It is a further object of the present invention to provide a developing device in which diffusion copies could be produced automatically and fast and in which a mutual displacement of positive and negative images düring the diffusion period of time would be excluded.

These and other objects of the invention are attained by a device for exposing and developing light-sensitive material, comprising a housing; a film-exposing means and developing means for processing two-sheet material in accordance with a diffusion process to obtain a plurality of two-sheet copies, said film-exposing means and said developing means being positioned in said housing; a diffusion space formed in said housing for a full development of copies and having an entrance and an exit; copy-receiving means including at least one flat copy-receiving wall having a format corresponding to that of a copy being processed and receiving each copy from said developing means so that two sheets of each copy lie on said wall in contact with each other; and means for shifting said wall in a step-like manner from a filling position at the entrance of said diffusion space to a discharge position at the exit of said diffusion space.

A plurality of copy-receiving walls with flat surfaces receiving copies from the developing means may be provided in the copy-receiving means.

The copy receiving means may further include a transport means, said walls being arranged on said transport means in an endless-belt-like manner, said transport means displacing said walls in the step-like manner.

The copy-receiving means may include a rotatable suction device having a plurality of suction boxes each provided with a respective flat copy-receiving wall, said rotatable suction device turning said copy-receiving walls in the step-like manner.

The copy-receiving means may include a connecting member pivotable in respect to said developing means and provided with transport rolls to form a transport track for copies being processed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
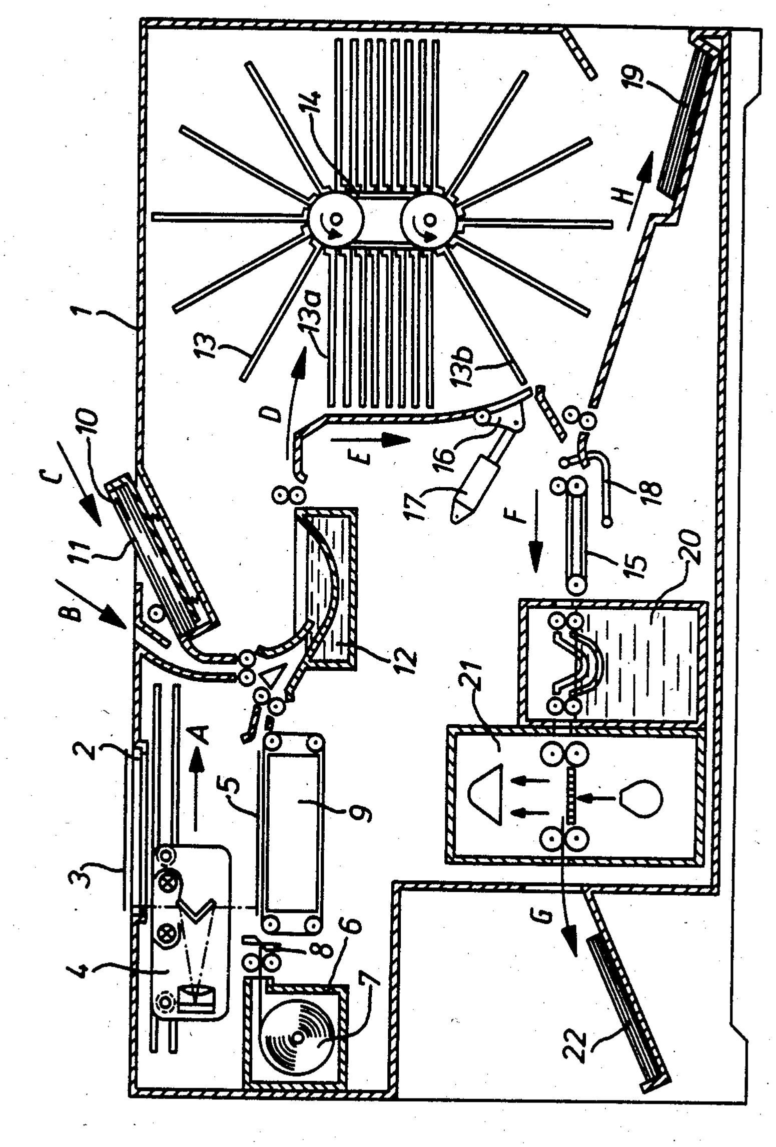
FIG. 1 is a schematic view of the exposure and developing device, in which bearing surfaces for receiving photoprints are arranged in a diffusion frame in a chain-like fashion, according to one embodiment of the invention.

Referring now to the drawings, and firstly to the embodiment shown in FIG. 1, the reference character 1 designates a housing of the copying device. A transparent exposure plate 2 for an original 3 to be copied is positioned on the upper side of housing 1. The image of the original 3 is exposed in the known fashion onto a negative paper sheet 5 of a two-sheet copy paper or material by means of an optical scanning and illumination device 4 movable relative to the original in the direction of arrow 4. A suitable conventional optical device can serve, as the optical scanning device adapted for developing immovable plane originals placed on an immovable flat scanning carrier in this device. A three-mirror optical device described in German Pat. No. 1,174,147 corresponding to U.S. Pat. No. 3,286,588 or a scanning device disclosed in German Pat. No. 1,203,115 corresponding to U.S. Pat No. 3,592,542 can be, for example used for this purpose in the film-developing device according to the present invention.

The negative paper sheets 5 are withdrawn from a paper supply reel 7 disposed in a light-proof cassette 6 and cut into portions by a cutting device 8 also of a known construction, from which each negative paper sheet is placed onto a suction platform 9 surrounded by a transport conveyor.

After a negative 5 has been exposed it is moved into a diffusion-developing device 12 filled with an activator fluid, also of a known construction described, for example in the German published application No. DE-OS 20 33 516 corresponding to U.S. Pat. No. 3,695,163. Each negative sheet 5 is combined in diffusion developing device 12 with a respective positive paper sheet 11 fed into device 12 from a stack 10 in the direction of arrow C. The positive paper sheets 11 can be also charged into developing device 12 by hand in the direction of arrow B.

For full development of the material composed of the negative sheet 5 and positive sheet 11 in the diffusion chamber or space this material is transported in the direction of arrow D onto a flat copy-receiving wall or surface 13*a* positioned at the entrance of the diffusion chamber. The outer size of the surface 13a corresponds to that of a material 5, 11 so that this material would not be subjected to any curves or bending during a suitable development time. This is important because in that case no mutual displacement between individual image spots of the negative and positive images would occur during the period of time in which a final image scanning takes place.

The copy-receiving surface 13a formes a stable portion of a series of similar copy-receiving walls or surfaces 13 arranged on a common transport conveyor 14 in the manner of an endless belt, copy-receiving surface due to the step-like rotation movement of transport conveyor 14 being moved downwardly in the direction of arrow E in a step-like fashion. This movement is controlled by a non-illustrated conventional drive-and-control device in such a manner than each time a new copy 5, 11 passes from diffusion-developing device 12 in the direction of arrow D a new copy-receiving wall 13 is in a position for receiving that new copy. The time for a full development of each copy 5, 11 would then be set to such a multiple period of the time of processing of each copy in the developing device 12 as the time of passing of the copy-receiving surfaces 13 between the surface 13a positioned at the entrance of the diffusion space and surface 13b located at the exit from the diffusion space.

The copy-receiving surface 13b is inclined to a horizontal in such a fashion that the copying material 5, 11 leaves that surface under gravity force and can pass to a conveyor 15 without any additional drive means. It is therefore not premature to set conveyer 15 into motion before aligning of the copy-receiving surface 13b with a further guiding transport conveyer if the movement of the copy-receiving walls 13 can be retained by means of an adjustable flap 16 which is actuated by a magnet 17.

A separating device 17 provided with a separating lever 18 is arranged between the flap 16 and transport conveyor 15. Lever 18 engages the front edge of each negative sheet 5 and guides the latter in the direction of arrow H onto a stack 19. The separating device is conventional and is disclosed, for example in German Pat. No. 1,238,331. Each positive paper sheet separated from a respective negative sheet is fed by means of conveyor band 15 in the direction of arrow F into a washing tub 20 and then into a drying device 21 from which each positive is discharged onto a stack 22.

Figure 2:
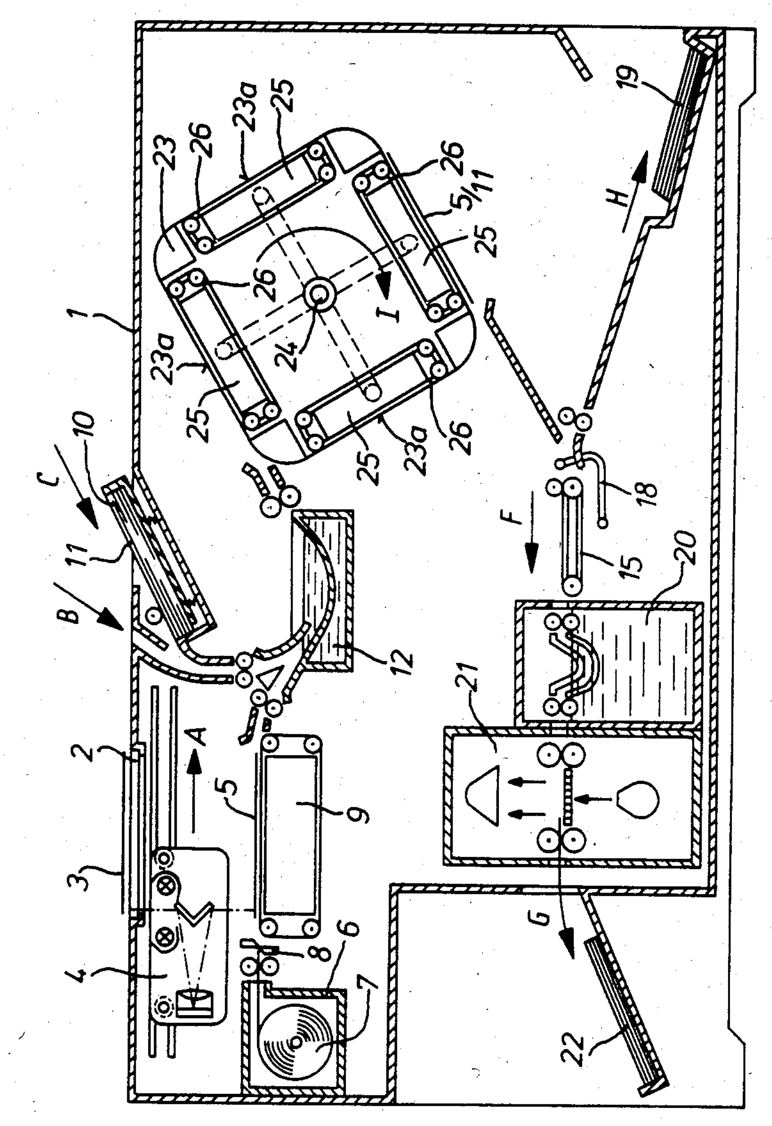
FIG. 2 is a schematic view of the exposure and developing device, in which bearing surfaces for receiving photoprints are arranged on a turnable suction platform, according to another embodiment of the invention.

In the embodiment of FIG. 2 the copying material 5, 11 developed in the developing device is held during the time of full development on flat outer wall or surfaces 23a of a turnable suction platform 23. The latter is provided with suction boxes 25 connected to a central suction conduit 24 and transporting conveyors 26 surrounding the suction boxes 25, respectively. The turnable suction platform 23 is switched on and makes a quarter of one turn in the direction of arrow I each time a new copy 5, 11 arrives at the platform so that for a full development of each copy a time of processing each copy on platform 23 is tripled relative to the time of developing each copy in device 12.

Figure 3:
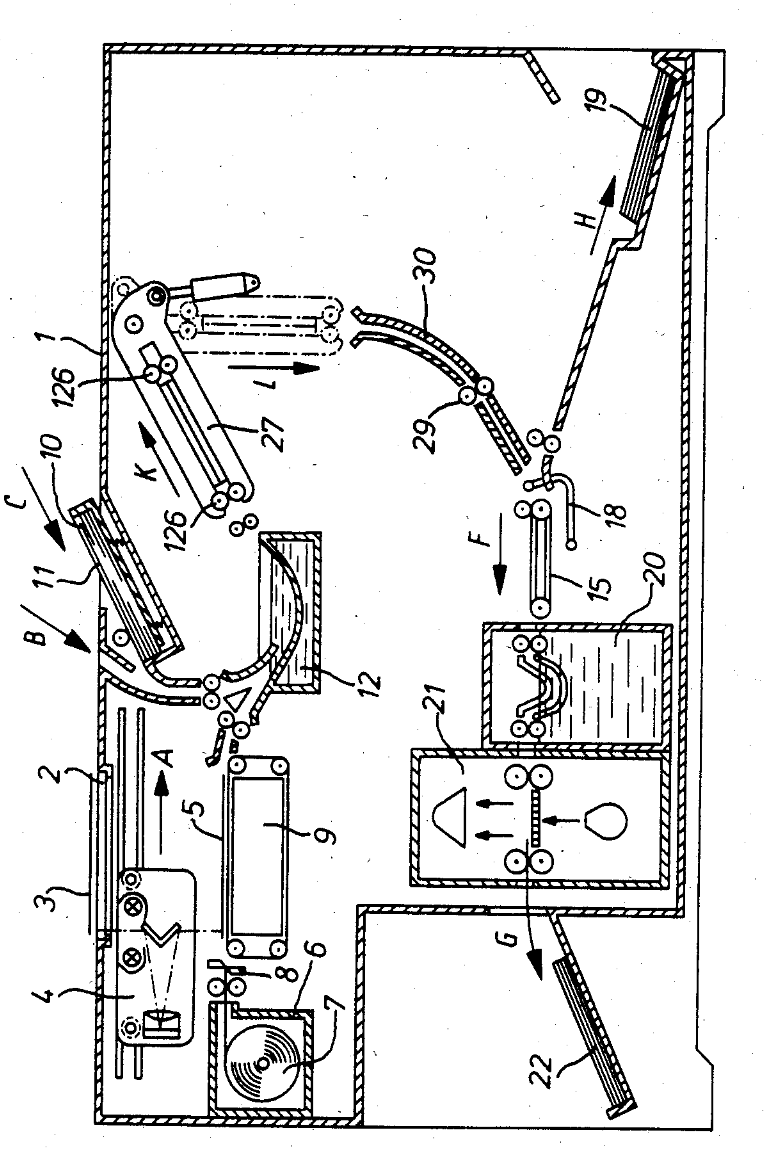
FIG. 3 is a schematic view of the exposure and developing device, in which a transport track is formed with a pivotable flat portion for receiving copy material thereon, according to a still another embodiment of the invention.

With reference to FIG. 3 it will be seen that the diffusion space is formed by a pivotable connection member 27 constituting a portion of the whole copy-transporting path. This pivotable member 27 is formed with a wall or surface 27a and provided with transport rolls 126. Another portion of the transport means is formed by a transport track 30 rigidly connected to housing 1 and provided with transport rolls 29. Transport roll pairs 126 and 29 are arranged in such a fashion that only an edge portion of each copy 5, 11 being transported is engaged by respective rolls so that the surface of each copy is not disturbed before a full development has taken place. The duration of the non-disturbed process of full development is in this case about the same as the time period of processing a copy in the developing device 12. To pass each copy from the developing device for further processing in a transport path the connection member 27 is pivoted relative to the developing device 12 and transport rolls 126 are set into motion in the direction of arrow K. Shortly before passing the next copy from the developing device the connection member 27 is pivoted towards the transport track 30 and a copy positioned in the connection member 27 will be discharged onto track 30 by means of transport rolls 126 in the direction of arrow 2 and engaged with transport rolls 29. The transport track 30 can be formed in principle as a flat track between the inlet of the track and transport roll pair 29 and have the length corresponding to at least the length of each copy 5, 11 so that an additional developing time equal to the time of processing of each copy in device 12 would be provided for each copy on this flat portion of track 30 before a copy has passed roll pair 29.

It will be understood that each of the elements described above, or two or more together, may also find a useful application in other types of photographic developing devices differing from the types described above.

While the invention has been illustrated and described as embodied in an exposing and developing device for light-sensitive materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for exposing and developing light-sensitive material, comprising a housing; a film-exposing means and developing means for processing two-sheet material in accordance with a diffusion process to obtain a plurality of two-sheet copies, said film-exposing means and said developing means being positioned in said housing; a diffusion space formed in said housing for a full development of copies and having an entrance and an exit; copy-receiving means including at least one flat copy-receiving wall having a format corresponding to that of a copy being processed and receiving each copy from said developing means so that two sheets in each copy lie on said wall in contact with each other; and means for shifting said wall in a step-like manner from a filling position at the entrance of said diffusion space to a discharge position at the exit of said diffusion space.

2. The device as defined in claim 1, wherein said copy-receiving means include a plurality of flat copy-receiving walls.

3. The device as defined in claim 2, wherein said copy-receiving means further include a transport means, said walls being arranged on said transport means in an endless-belt-like manner, said transport means displacing said walls in the step-like manner.

4. The device as defined in claim 3, wherein said copy-receiving means include a rotatable suction device having a plurality of suction boxes each provided with a respective flat copy-receiving wall, said rotatable suction device turning said copy-receiving walls in the step-like manner.

5. The device as defined in claim 1, wherein said copy-receiving means include a connecting member pivotable in respect to said developing means and provided with transport rolls to form a transport track for copies being processed.

* * * * *